US009267023B2

(12) United States Patent
Lichtenhan et al.

(10) Patent No.: US 9,267,023 B2
(45) Date of Patent: Feb. 23, 2016

(54) METHOD FOR MODIFYING SURFACE PROPERTIES WITH NANOSTRUCTURED CHEMICALS

(71) Applicant: Hybrid Plastics, Inc., Hattiesburg, MS (US)

(72) Inventors: Joseph D. Lichtenhan, Petal, MS (US); Xuan Fu, Purvis, MS (US); Marion R. Blue, Richton, MS (US); Paul Wheeler, Hattiesburg, MS (US); Rahul Misra, Hattiesburg, MS (US); Sarah Morgan, Hattiesburg, MS (US)

(73) Assignee: Hybrid Plastics, Inc., Hattiesburg, MS (US)

( * ) Notice: Subject to any disclaimer, the term of this patent is extended or adjusted under 35 U.S.C. 154(b) by 0 days.

(21) Appl. No.: 14/225,182

(22) Filed: Mar. 25, 2014

(65) Prior Publication Data
US 2014/0221544 A1 Aug. 7, 2014

Related U.S. Application Data

(63) Continuation of application No. 12/787,145, filed on May 25, 2010, now Pat. No. 8,680,215, which is a continuation of application No. 11/641,543, filed on Dec. 18, 2006, now Pat. No. 7,723,415, which is a continuation-in-part of application No. 11/354,583, filed on Feb. 14, 2006, now abandoned, which is a continuation-in-part of application No. 11/342,240, filed on Jan. 27, 2006, now Pat. No. 7,638,195, which is a continuation-in-part of application No. 11/225,607, filed on Sep. 12, 2005, now Pat. No. 7,553,904, which is a continuation-in-part of application No. 11/166,008, filed on Jun. 24, 2005, now abandoned, and a continuation of application No. 10/351,292, filed on Jan. 23, 2003, now Pat. No. 6,933,345, which is a continuation-in-part of application No. 09/818,265, filed on Mar. 26, 2001, now Pat. No. 6,716,919, which is a continuation of application No. 09/631,892, filed on Aug. 4, 2000, now Pat. No. 6,972,312.

(60) Provisional application No. 60/751,362, filed on Dec. 16, 2005, provisional application No. 60/652,922, filed on Feb. 14, 2005, provisional application No. 60/648,327, filed on Jan. 27, 2005, provisional application No. 60/608,582, filed on Sep. 10, 2004, provisional application No. 60/147,435, filed on Aug. 4, 1999, provisional application No. 60/351,523, filed on Jan. 23, 2002, provisional application No. 60/192,083, filed on Mar. 24, 2000.

(51) Int. Cl.
C08G 77/04 (2006.01)
C08L 23/12 (2006.01)
C08L 23/06 (2006.01)
C08J 3/20 (2006.01)
C08J 5/00 (2006.01)
C08K 9/06 (2006.01)
B82Y 30/00 (2011.01)
C08K 5/549 (2006.01)

(52) U.S. Cl.
CPC .. *C08L 23/12* (2013.01); *C08J 3/20* (2013.01); *C08J 5/005* (2013.01); *C08K 9/06* (2013.01); *C08L 23/06* (2013.01); *B82Y 30/00* (2013.01); *C08K 5/549* (2013.01); *C08K 2201/011* (2013.01); *C08L 2310/00* (2013.01); *C08L 2666/22* (2013.01); *C08L 2666/54* (2013.01)

(58) Field of Classification Search
CPC ...................................................... C08K 5/5419
USPC .......................................... 523/209; 525/474
See application file for complete search history.

(56) References Cited

U.S. PATENT DOCUMENTS

| 5,552,466 | A  | * | 9/1996 | Beckley et al. | 524/265 |
| 6,933,345 | B1 | * | 8/2005 | Lichtenhan et al. | 525/101 |
| 7,553,904 | B2 | * | 6/2009 | Lichtenhan et al. | 525/101 |
| 8,680,215 | B2 | * | 3/2014 | Lichtenhan et al. | 525/474 |
| 2003/0050408 | A1 | * | 3/2003 | Puhala et al. | 525/479 |
| 2003/0166818 | A1 | * | 9/2003 | Griswold et al. | 528/34 |
| 2006/0217473 | A1 | * | 9/2006 | Hergenrother et al. | 524/261 |

OTHER PUBLICATIONS

Freeman (Silicones, Published for the Plastics Institute, (1962) p. 27).*

* cited by examiner

*Primary Examiner* — Kuo-Liang Peng
(74) *Attorney, Agent, or Firm* — David H. Jaffer; Pillsbury Winthrop Shaw Pittman LLP

(57) ABSTRACT

A method of using metallized and nonmetallized nanostructured chemicals as surface and volume modification agents within polymers and on the surfaces of nano and macroscopic particulates and fillers. Because of their 0.5 nm-3.0 nm size, nanostructured chemicals can be utilized to greatly increase surface area, improve compatibility, and promote lubricity between surfaces at a length scale not previously attainable.

3 Claims, 8 Drawing Sheets

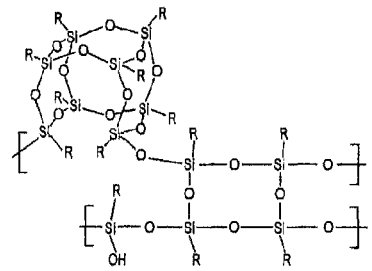
$[(RSiO_{1.5})n]\Sigma n$ where n = 1-1,000,000
Poly POSS Oligomers
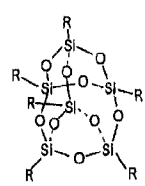 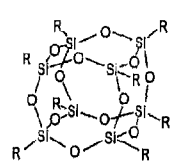 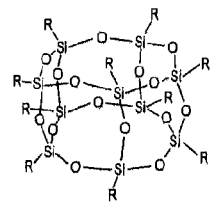
$[(RSiO_{1.5})_6]\Sigma_6$    $[(RSiO_{1.5})_8]\Sigma_8$    $[(RSiO_{1.5})_{12}]\Sigma_{12}$
POSS Oligomer Cages
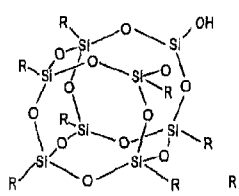 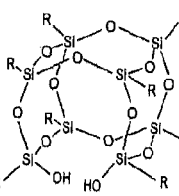 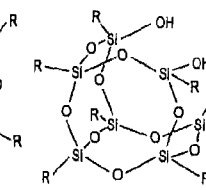 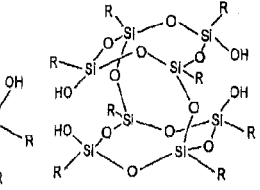
$[(RSiO_{1.5})_7(R(HO)SiO)_1]\Sigma_8$     $[(RSiO_{1.5})_4(R(HO)SiO)_3]\Sigma_7$     $[(RSiO_{1.5})_4(R(HO)SiO)_4]\Sigma_8$
$[(RSiO_{1.5})_6(R(HO)SiO)_2]\Sigma_8$     $[(RSiO_{1.5})_4(R(HO)SiO)_2]\Sigma_6$
POSS Silanol Oligomer Cages
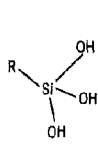 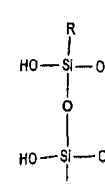 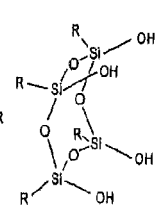
FIG.4    POSS Silanol Oligomer Fragments

METHOD FOR MODIFYING SURFACE PROPERTIES WITH NANOSTRUCTURED CHEMICALS

RELATED APPLICATIONS

This application is a continuation of U.S. patent application Ser. No. 12/787,145 filed May 25, 2010 (now U.S. Pat. No. 8,680,215), which is a continuation of U.S. patent application Ser. No. 11/641,543 filed Dec. 18, 2006 (now U.S. Pat. No. 7,723,415), which claims the benefit of U.S. Provisional Patent Application Ser. No. 60/751,362 filed Dec. 16, 2005, and is a continuation-in-part of U.S. patent application Ser. No. 11/354,583 filed Feb. 14, 2006 (abandoned), which claims the benefit of U.S. Provisional Application Ser. No. 60/652,922 filed Feb. 14, 2005; and is a continuation-in-part of U.S. patent application Ser. No. 11/342,240 filed Jan. 27, 2006 (now U.S. Pat. No. 7,638,195), which claims the benefit of U.S. Provisional Patent Application Ser. No. 60/648,327 filed Jan. 27, 2005; and is a continuation-in-part of U.S. patent application Ser. No. 11/225,607 filed Sep. 12, 2005 (now U.S. Pat. No. 7,553,904), which claims priority from U.S. Provisional Patent Application Ser. No. 60/608,582 filed Sep. 10, 2004, and is a continuation-in-part of U.S. patent application Ser. No. 11/166,008 filed Jun. 24, 2005 (abandoned), which is a continuation of U.S. patent application Ser. No. 10/351,292, filed Jan. 23, 2003 (now U.S. Pat. No. 6,933,345), which claims priority from U.S. Provisional Patent Application Ser. No. 60/351,523, filed Jan. 23, 2002, and is a continuation-in-part of U.S. patent application Ser. No. 09/818,265, filed Mar. 26, 2001 (now U.S. Pat. No. 6,716,919), which claims priority from U.S. Provisional Patent Application Ser. No. 60/192,083, filed Mar. 24, 2000. The disclosures of the foregoing applications are incorporated herein by reference.

FIELD OF THE INVENTION

This invention relates generally to methods for enhancing the bulk and surface properties of a polymer through use of POSS nanostructured chemicals as dispersion aids, surface modifiers, and interfacial friction modifiers.

BACKGROUND OF THE INVENTION

It is common practice to modify particulates of polymer, organic, inorganic, man-made or natural origin materials with silane coupling agents, surfactants, polymeric coatings, chemical oxidation treatments, chemical reduction treatments, hot and cold treatments, and radiation exposures in attempts to alter the surface properties of the particle with itself or with a secondary material, or to improve its dispersive characteristics.

Prior art associated with particulates, coatings, and processing techniques has not been able to precisely control particulate and material surface properties and surface-surface interactions at the 1 nm to 50 nm level. Therefore, a need exists for surface modification agents and techniques to provide such control.

SUMMARY OF THE INVENTION

The present invention describes methods of dispersing particulates into a polymer by controlling its surface properties at the nanoscopic level with the use of nanostructured chemicals. The method is highly desirable for the creation of chemical masterbatches. This invention also teaches a method of controlling the surface and interfacial properties of polymeric, metallic, ceramic, and surfaces derived from natural, man-made or biological materials by controlling their nanoscopic surface topology, surface area, and associated volume via nanostructured chemicals. Such surface control can be applied in both remedial and original manufacturing.

The invention solves the problem of dispersing nano and macroscopic particulates at high concentrations within a polymer matrix. The solution is enabled uses nanostructured chemicals as dispersion aids and surface modifying agents within polymeric materials and on particulate surfaces. The invention also provides a means for reducing the friction of surfaces through the use of the same nanostructured chemicals as interfacial modifiers.

The use of POSS nanostructured chemicals for control of particulate dispersion in polymers is useful for the preparation of highly concentrated particulate masterbatches. The purpose of the masterbatch is to provide performance enhancing additive concentrates in an easily dilutable form. Masterbatches are desired by formulators, molders, and polymer converters as they provide a convenient method of increasing the value of common plastics and are lower-cost to ship than a fully diluted product. The ability to increase the concentration, complexity, number, and type of additives that can be incorporated into a masterbatch enables additional functionality and further increases value.

Combination of three primary material are preferred for masterbatch compositions: (1) POSS nanostructured chemicals, POMS metallized nanostructured oligomers, or metal containing nanostructured polymers; (2) polymers or polymer/monomer combinations including traditional amorphous polymer systems such as acrylics, carbonates, epoxies, esters, silicones, polyolefins, polyethers, polyesters, polycarbonates, polyimides, polyamides, polyurethanes, phenolics, cyanate esters, polyureas, resoles, polyanalines, fluoropolymers, and silicones and polymers containing functional groups; traditional semicrystalline and crystalline polymer systems such as styrenics, amides, nitriles, olefins, aromatic oxides, aromatic sulfides, and esters; or ionomers or traditional rubbery polymer systems derived from hydrocarbons and silicones; and (3) nanoscopic and macroscopic particulates including metals, metal alloys, oxides, ceramic, ceramic alloys, microtubes, nanotubes, inorganic, organic, and any particulate of man-made or natural origin.

The nanostructured chemical can be utilized to surface functionalize a particle prior to or during masterbatch mixing. It can be added to the polymer followed by addition of the particulate filler or can be added simultaneously with the polymer and filler in a sequence that provides the most desirable performance and economic advantages.

Preferably, the process of particulate dispersion occurs by combining together the components of interest and effecting the surface and interfacial modification through mixing. All types and techniques of blending, and mixing including melt blending, dry blending, grinding, milling, solution blending, reactive and nonreactive mixing are also effective.

In addition, because of their chemical nature, POSS nanostructured chemicals can be tailored to show compatibility or incompatibility with nearly all polymer, biological, organic, and inorganic systems. Their physical size in combination with their tailorable compatibility enables nanostructured chemicals to be selectively incorporated into plastics, and to control the dynamics of coils, blocks, domains, and segments, and subsequently favorably impact a multitude of physical properties. The properties most favorably improved are time dependent mechanical and thermal properties such as viscosity, friction, solubility, dispersion, heat distortion, creep, shrinkage, compression set, modulus, hardness, abrasion resistance, electrical resistance, electrical conductivity, radiation absorption, luminescence, emissivity, degree of cure, biological compatibility and biological function. In addition to mechanical properties, other physical properties that are favorably improved include thermal conductivity and electrical conductivity, fire resistance, and gas barrier and gas and moisture permeation properties, which are selectively controlled depending on cage size, composition and homogeneity of distribution.

BRIEF DESCRIPTION OF THE DRAWINGS

FIG. 4 illustrates representative examples of POSS nanostructured chemicals;

FIG. 8(a) is a dispersion of polypropylene containing 5 wt % SO1450 and 1 wt % nanoscopic $TiO_2$. FIG. 8(b) is a dispersion of polypropylene with 1 wt % nanoscopic $TiO_2$;

DEFINITION OF FORMULA REPRESENTATIONS FOR NANOSTRUCTURES

Figure 1:
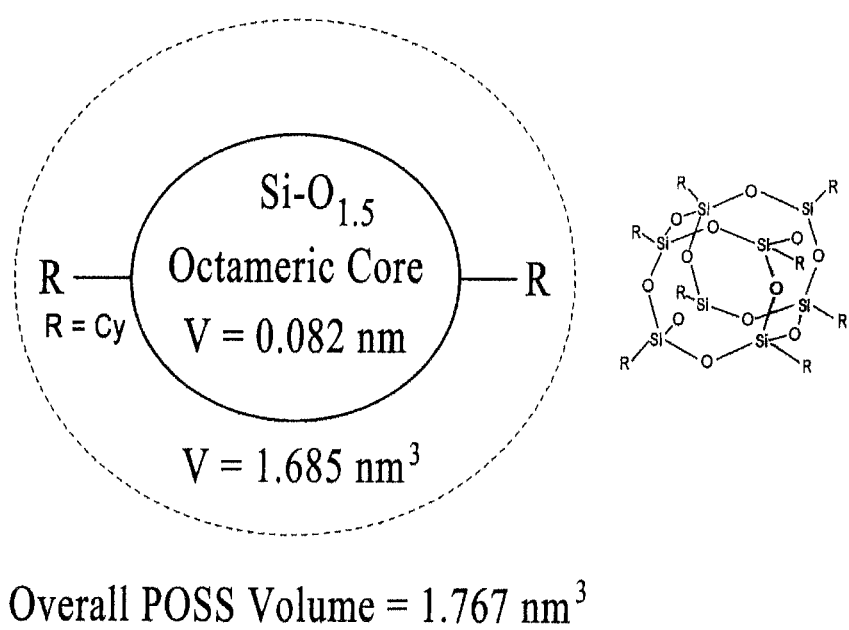
FIG. 1 illustrates the representative volume contributions of a 1.5 nm POSS molecule.

For the purposes of understanding this invention's chemical compositions the following definition for formula representations of Polyhedral Oligomeric Silsesquioxane (POSS), Polyhedral Oligometallosesquioxane (POMS) and Polyhedral Oligomeric Silicate (POS) nanostructures is made.

Polysilsesquioxanes are materials represented by the formula $[RSiO_{1.5}]_\infty$ where $\infty$ represents molar degree of polymerization and R=represents an organic substituent (H, siloxide, siloxy, cyclic or linear aliphatic or aromatic groups that may additionally contain reactive functionalities such as alcohols, esters, amines, ketones, olefins, ethers or halides). Polysilsesquioxanes may be either homoleptic or heteroleptic. Homoleptic systems contain only one type of R group while heteroleptic systems contain more than one type of R group. As a special case R may also include fluorinated organic groups.

POSS, POMS, and POS nanostructure compositions are represented by the formula:

$[(RSiO_{1.5})_n]_{\Sigma\#}$ for homoleptic compositions $[(RSiO_{1.5})_n(R'SiO_{1.5})_m]_{\Sigma\#}$ for heteroleptic compositions (where R≠R')

$[(RSiO_{1.5})_n(RXSiO_{1.0})_m]_{\Sigma\#}$ for functionalized heteroleptic compositions (where R groups can be equivalent or inequivalent)

$[(RSiO_{1.5})_n(RSiO_{1.0})_m(M)_j]_{\Sigma\#}$ for heterofunctionalized heteroleptic compositions In all of the above R is the same as defined above and X includes but is not limited to OH, Cl, Br, I, alkoxide (OR), acetate (OOCR), peroxide (OOR), amine ($NR_2$), isocyanate (NCO), and R. The symbol M refers to metallic elements within the composition that include high and low Z metals including s and p block metals, d and f block transition, lanthanide, actinide metals, in particular, Al, B, Ga, Gd, Ce, W, Ni, Eu, U, Y, Zn, Mn, Os, Ir, Ta, Cd, Cu, Ag, V, As, Tb, In, Ba, Ti, Sm, Sr, Pt, Pb, Lu, Cs, Tl, and Te. The symbols m, n and j refer to the stoichiometry of the composition. The symbol Σ indicates that the composition forms a nanostructure and the symbol # refers to the number of silicon atoms contained within the nanostructure. The value for # is usually the sum of m+n, where n ranges typically from 1 to 24 and m ranges typically from 1 to 12. It should be noted that Σ# is not to be confused as a multiplier for determining stoichiometry, as it merely describes the overall nanostructural characteristics of the system (aka cage size).

DETAILED DESCRIPTION OF THE INVENTION

The present invention recognizes that significant property enhancements can be realized by the modification of particulate and polymer surfaces with nanostructured chemicals. This greatly simplifies surface modification since the prior art does not control surface area, volume, or nanoscopic topology, and does not function as interfacial control agents nor as alloying agents within polymer morphology or between dissimilar materials.

The prior art is deficient in recognizing and establishing control over nanoscopic surface features. The present invention demonstrates that properties such as dispersion, viscosity, surface energy, lubricity, adhesion, and stain resistance can be easily and favorably controlled through use of nanostructured chemicals at material surfaces and interfaces. Properties most favorably improved are time dependent mechanical and thermal properties such as particle dispersion, dispersion stability, heat distortion, creep, compression set, strength, toughness, visual appearance, feel, and texture, shrinkage, modulus, hardness and abrasion resistance, impact resistance, fire resistance, shrinkage reduction, expansion reduction, adhesion, lubricity, conductive, dielectric, capacitive properties, degree of cure, rate of cure, radiation absorptive properties and biological activity. In addition other physical properties are favorably improved, including gas and moister permeability, paint, print, film and coating properties.

The fundamental premise behind surface modification in this invention is underpinned mathematically through computation of the surface area and volume contribution provided at various loadings of 1 nm spherical nanostructured chemical particles either into or onto a material. Computation reveals that as a particle becomes smaller it contributes more surface area and more volume as a wt % of its incorporation into a material than would larger particles (see FIGS. 1-3). The net effect is that even small loadings of sufficiently small nanoparticles can ultimately dominate the surface characteristics of a material. The new surface provided by nanomodification can be utilized to either decrease surface roughness by filling-in surface defects or can increase surface roughness by creating more surface. Furthermore, it can be utilized to either increase or decrease the surface-surface interaction between two or more materials by making their surfaces smoother or rougher. The material surfaces can be similar or dissimilar, and of man-made or of natural or biological origin.

Practical applications of this invention require the use of nanoscopic particulate-like entities. Most desirably, such particles would have a known and precise chemical composition, rigid three dimensional shape, controllable diameter, and controllable surface chemistry. Nanostructured chemicals meet such requirements and are preferably employed in this invention.

Nanostructured chemicals are best exemplified by those based on low-cost Polyhedral Oligomeric Silsesquioxanes (POSS) and Polyhedral Oligomeric Silicates (POS) and Polyhedral Oligometallosesquioxanes (POMS). FIG. 4 illustrates some representative examples of monodisperse POSS nanostructured chemicals. However, logical extensions of nanoscopic chemicals include carboranes, polyoxometallates, and POMS, and are also contemplated in this invention. POMS are nanostructured POSS chemicals that contain one or more metals inside or outside the central cage framework. In certain instances, cages may contain more than one metal atom, or more than one type of metal atom or even metal alloys in or on the cage.

POSS nanostructured chemicals contain hybrid (i.e. organic-inorganic) compositions and cage-like frameworks that are primarily comprised of inorganic silicon-oxygen bonds which may also contain one or more metal atoms bound to the cage. In addition to the metal and silicon-oxygen framework, the exterior of a nanostructured chemical is covered by both reactive and nonreactive organic functionalities (R), which ensure compatibility and tailorability of the nanostructure with other substances. Unlike particulate fillers, POSS nanostructured chemicals dissolve into polymers and solvents and exhibit a range of melting points from $-40°$ C. to $400°$ C.

POSS nanostructured chemicals bearing metal atoms (POMS), silanols, alcohols, amines or other polar groups are preferably utilized as dispersion and surface modification agents because they can chemically interact and even permanently bond to the surface of silica, metallic or polymer particles while nonreactive groups on the cage can compatibilize the surface toward a secondary material or secondary surface. The chemical nature of POSS nanostructured chemicals also renders their dispersion characteristics to be governed by the Gibbs free energy of mixing equation ($\Delta G = \Delta H - T\Delta S$) rather than kinetic dispersive mixing as for insoluble particulates. Thus, the ability of POSS to interact with a surface through Van der Waals interactions, covalent, ionic, or hydrogen bonding can be utilized to chemically, thermodynamically, and kinetically drive their dispersion and surface modification. Furthermore, since POSS cages are monoscopic in size, entropic dispersion ($\Delta S$) is favored.

Figure 5:
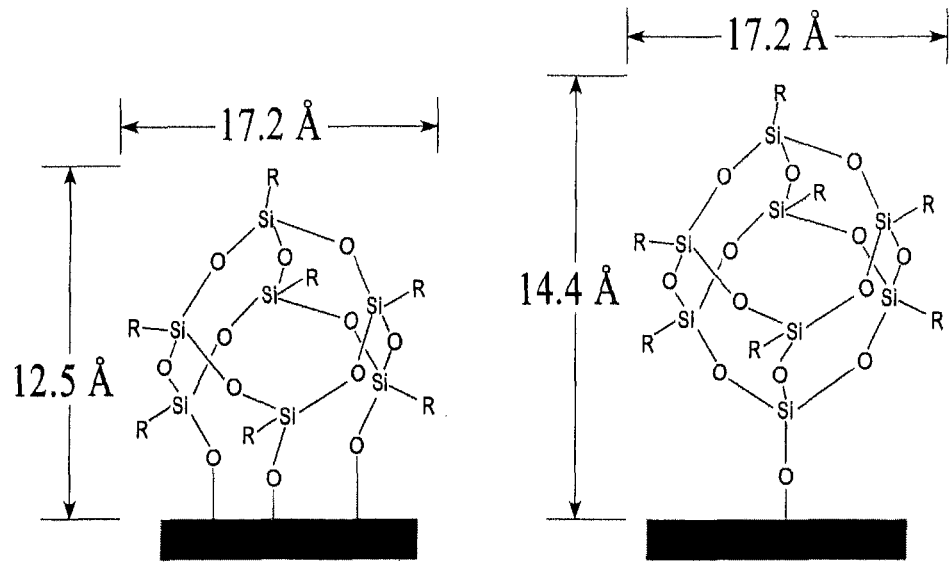
FIG. 5 illustrates different surface topology for cages bound to a surface by one or three reactive groups.

Each POSS nanostructured chemical also has a molecular diameter that can be controlled through variation of cage size and the length of the cage R groups attached to the cage (typical range from 0.5 nm to 5.0 nm). The molecular diameter is key to providing control over surface topology, surface area, and volume contributions in optimal formulations. For example, a cage bound to a surface by three silanol groups provides a lower topological profile than a cage bound at one vertice (FIG. 5).

Figure 6:
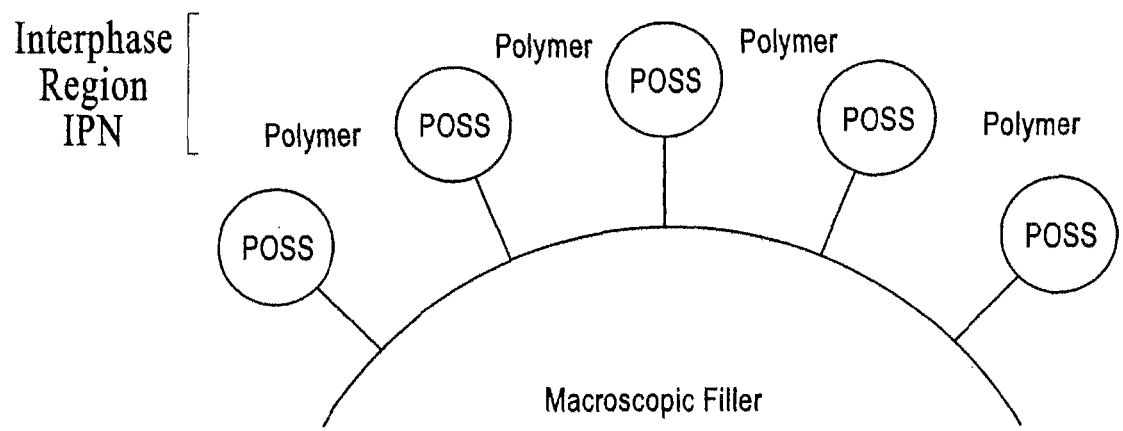
FIG. 6 illustrates the use of a nanostructured chemical to increase the surface area of a particle.

Additionally, the topological control that POSS cages offers can be used advantageously as bumps on a surface (FIG. 6). The resulting surface roughness will increase the amount of bondable surface area and can be utilized to disrupt the interaction of filler particulates with each other. It is well known that filler-filler interactions lead to self-quenching, agglomeration and inefficient dispersion of fillers and additives. POSS greatly reduces filler-filler interactions and self association by providing a nanoscopic spacer on the surface of particles and between polymer chains.

Consequently, POSS surface modification can reduce surface friction by decreasing the areal contact between two surfaces. Because POSS cages are molecules they can also melt and thereby reduce friction through nanoscopic surface lubrication and through isoviscous flow. This feature is particularly attractive for use in low friction fabrics, bandages, films, fabrics, tapes, and clothing.

The use of POSS to promote lower surface friction is beneficially utilized in sabots and shotgun wadding to retain projectile kinetic energy (FIG. 7) against loss from barrel friction and aerodynamic drag. As a projectile translates the interfacial friction is reduced through lubrication by POSS R groups and also reduces barrel fouling.

Figure 2:
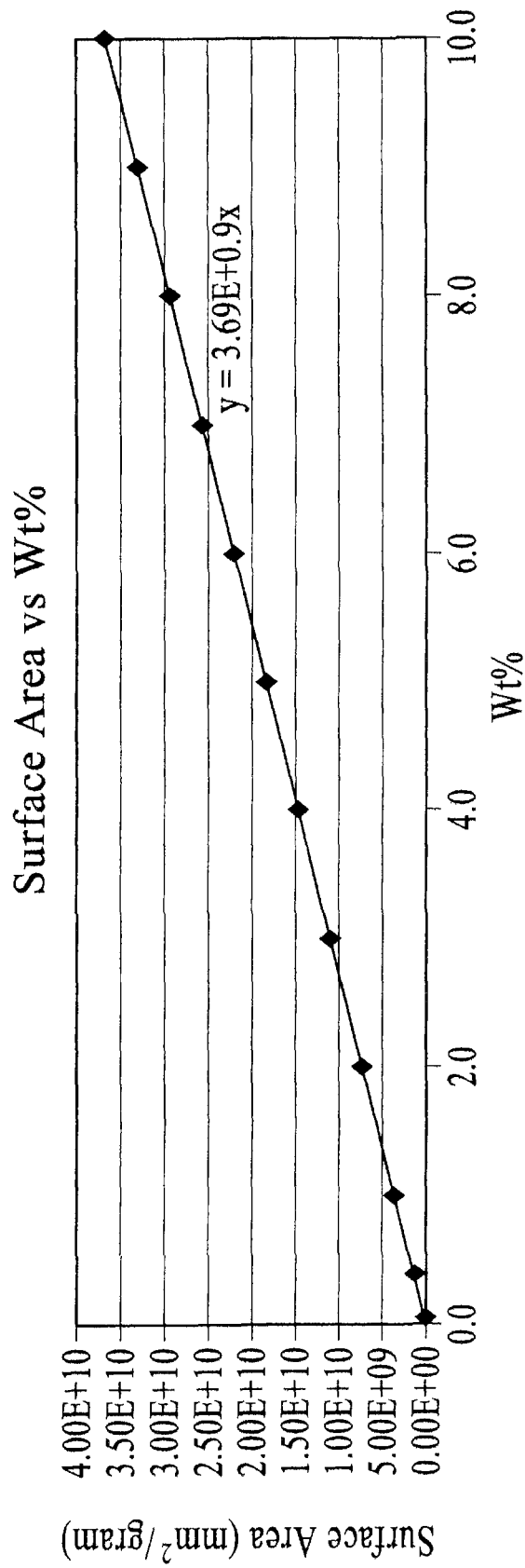
FIG. 2 illustrates the impact of surface area relative to weight % loading of POSS.
Figure 3:
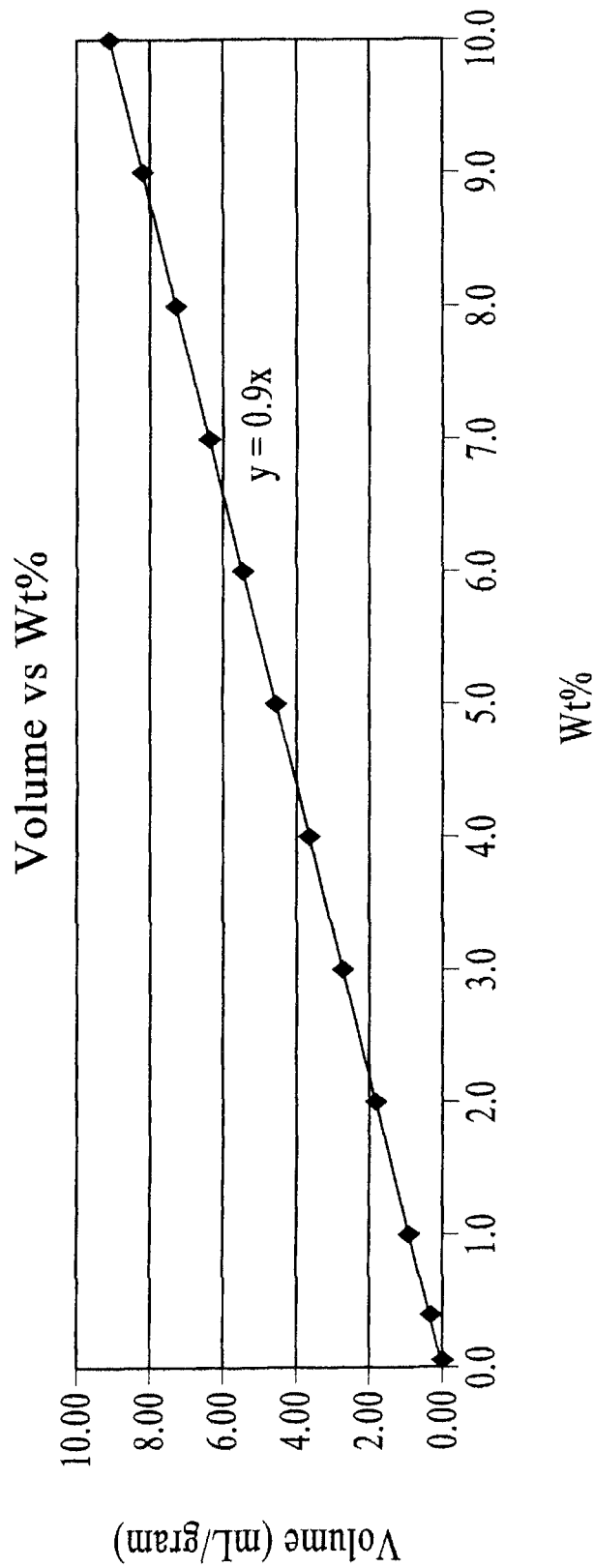
FIG. 3 illustrates the volume contribution relative to weight % loading of POSS.

Furthermore, the use of POSS nanostructured chemicals is very cost effective because only a small amount is needed to greatly increase the surface area (FIG. 2). Computations indicate that a 1 wt % incorporation of POSS onto a material provides a billion $nm^2/g$ increase in surface area. Thus the incorporation of small amount of FOSS is both economically and technically effective at dominating surface area.

EXAMPLES

General Process Variables Applicable to all Processes

As is typical with chemical processes, there are a number of variables that can be used to control the purity, selectivity, rate and mechanism of any process. Variables influencing the process for the incorporation of nanostructured chemicals (e.g. POSS, POMS, POS) into plastics includes the size, polydispersity, topology, composition, and rigidity of the nanostructured chemical. Similarly the molecular weight, polydispersity and composition of the polymer system must also be matched with that of the nanostructured chemical. Finally, the kinetics, thermodynamics, and processing aids used during the compounding process are also tools of the trade that can impact the loading level and degree of enhancement resulting from incorporation of nanostructured chemicals into polymers. Blending processes such as melt blending, dry blending, milling, grinding, and solution mixing blending are all effective in utilizing nanostructured chemicals. Continuous, semicontinuos, and batch process methods of incorporation can be used.

Methods for application include master batching, mixing, blending, milling, grinding, and thermal or solvent assisted methods including spraying and vapor deposition. Masterbatching is particularly desired because it affords automated and continuous production and consequent cost saving advantages. The incorporation of a nanostructured chemical into or onto a particle polymer favorably impacts a multitude of physical properties.

Example 1

Masterbatch Dispersion of Particles

POSS trisilanols were added to metallic particles by dissolving the POSS in dicholoromethane followed by addition of the metal particle powder. The solvent was then recovered under reduced pressure and the solid was heated to promote bonding of the POSS to the surface through Si—O—M bond formation.

Figure 8:
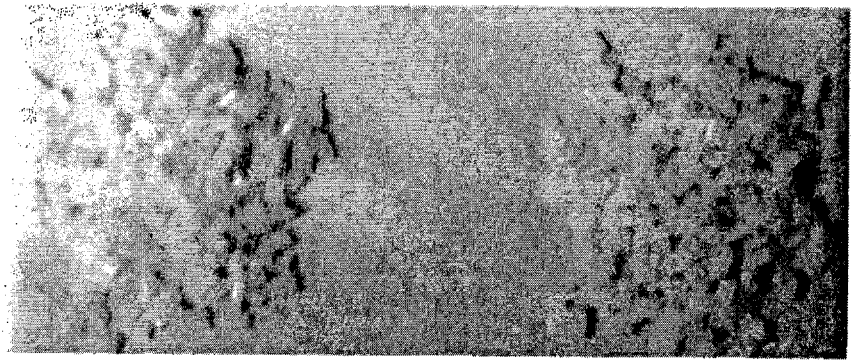
FIGS. 8(a) and 8(b) illustrate the use of nanostructured chemicals to increase the brightness of $TiO_2$ dispersions in polypropylene.

POSS trisilanols were added to thermoplastic polymers by melt compounding followed by addition of metallic particles and additional melt compounding. Similarly POSS trisilanols and metallic powders were added to a polymer during melt compounding followed by extrusion and pelletizing of the final composition. A striking observation was an increased bright whiteness of the systems utilizing POSS trisilanols and nanoscopic titanium dioxide as compared to formulations without the POSS surface modification (FIG. 8).

Figure 9:
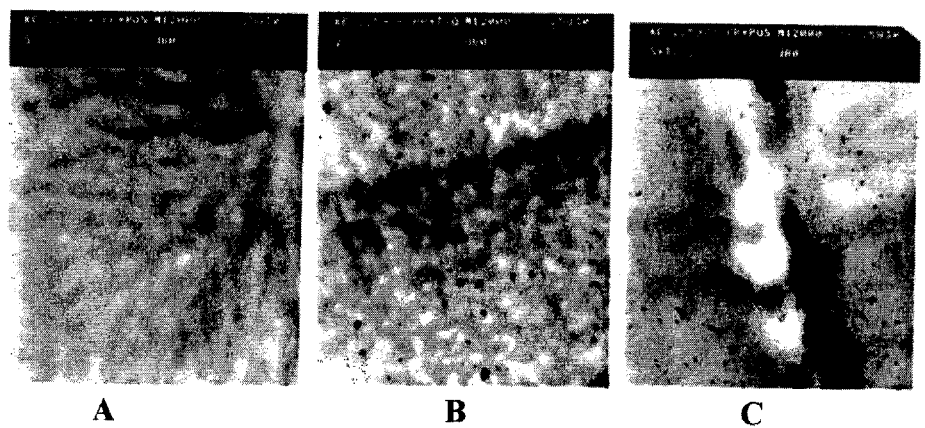
FIG. 9 is a transmission electron micrography comparison of (A) 5 wt % SO1450 dispersed in polypropylene, (B) 100 nm average diameter of nano-$TiO_2$ dispersed in polypropylene at 1 wt % level, and (C) 50 nm average diameter of nano-$TiO_2$ dispersed in polypropylene containing 5 wt % SO1450 and 1 wt % nano-$TiO_2$.

In addition to increased brightness, the use of POSS trisilanols resulted in finer particle sizes and more uniform distributions than could be obtained without nanoscopic surface modification. The dispersion level of the POSS within the polymer with and without the metallic particle is provided as evidence of the ability to create masterbatches with enhanced dispersion (FIG. 9).

Specific combinations of POSS with polymer and fillers are necessary to obtain optimal dispersions and masterbatch concentrations. For example heptaisoOctyl POSS trisilanol #SO1455, TrisilanolisoButyl POSS #SO1450, or OctaisoButyl POSS #MS0825, are most preferably utilized with polyethylene, polypropylene and related polyolefins. While masterbatch concentrations of POSS at greater than 20 wt % can be utilized, loading levels of 0.1 wt % POSS are effective at creation of stable dispersions.

Masterbatches of polar thermoplastics such as polyamides, polyethers, polycarbonates, polyesters, and polyurethanes preferably utilize trisilanolphenyl POSS #SO1458 or trisilanolisoOctyl POSS #SO1455. While masterbatch concentrations of POSS at greater than 20 wt % can be utilized, loading levels of 0.1 wt % POSS are also effective at creation of stable dispersions.

Masterbatches containing 75% by weight of inorganic solid such a $Gd_2O_3$ can be achieved while maintaining high levels of dispersion and processability into molded articles.

Example 2

Topographic Control of Molded Plastics

Figure 10:
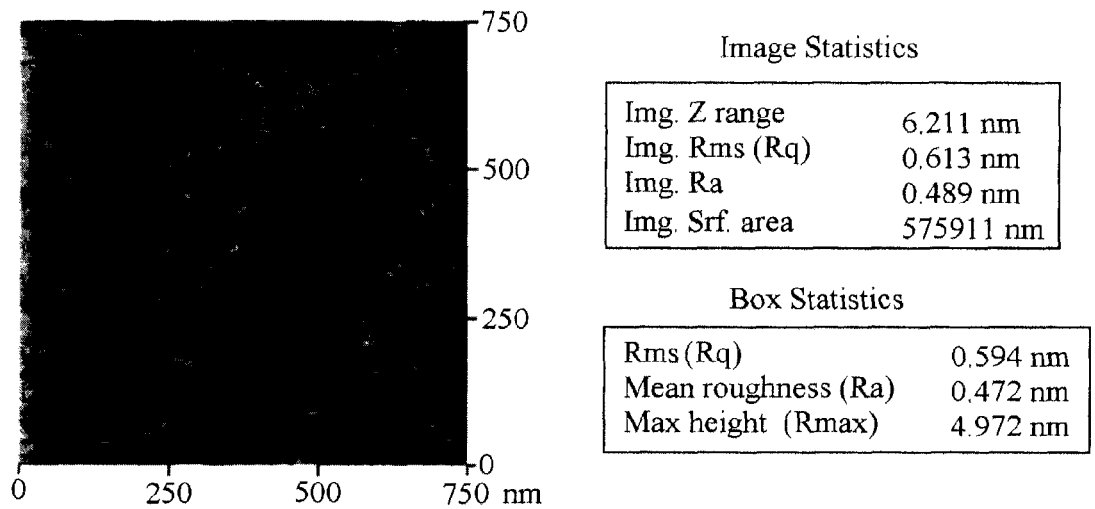
FIG. 10 illustrates the surface of a polypropylene control.
Figure 11:
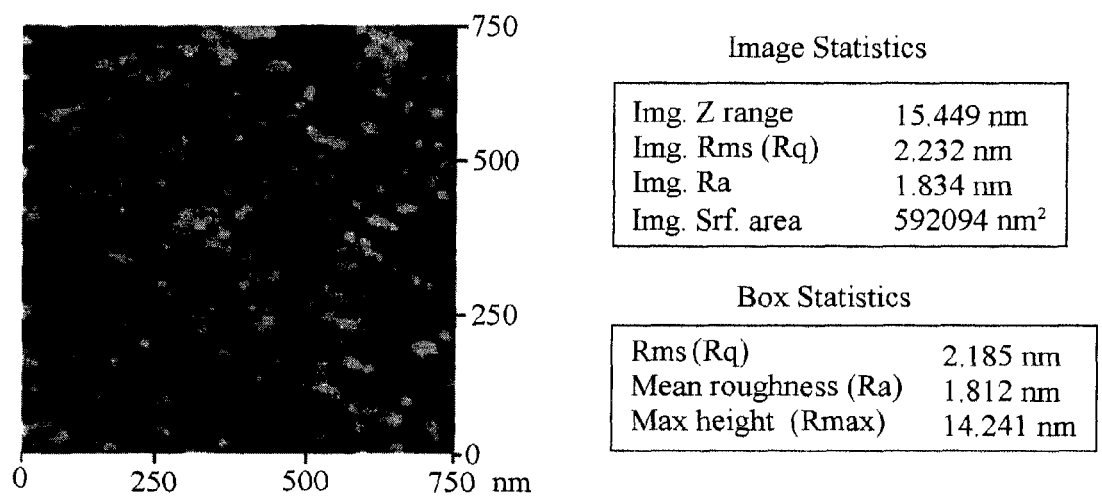
FIG. 11 illustrates the surface of a 10% MS0825 POSS/polypropylene formulation.

Masterbatches containing 5 and 10 wt % Octaisobutyl POSS (#MS0825) and polypropylene (PP) were prepared utilizing a continuous co-rotating twin screw extruder with an L:D ratio of 40:1. Surface topography measurements were made by hot pressing the extrudate between clean silicon wafers and conducting tapping mode surface topography. The relative surface roughness from incorporation of 10% MS0825 POSS increased four fold (from 0.61 nm for PP) (FIG. 10) to 2.23 nm for the POSS-PP (FIG. 11). The topographical measurements verify the control of surface roughness at the nanoscopic length scale and the uniform incorporation of MS0825 POSS throughout the PP in 1.5-50 nm domains.

Example 3

Surface Friction Control

Surface topology control necessarily renders control over surface friction properties. Nanoscale surface friction studies were performed via AFM in lateral force mode (LFM) on 1 μm×1 μm scan size for master batches of POSS in thermoplastic polymers. Relative coefficient of friction (μ) is defined as the ratio of the total lateral friction force ($F_f$) to the total normal force ($F_N$). In LFM AFM, the surface is scanned in the direction perpendicular to the long axis of the cantilever and the probe experiences a friction force in the direction opposite to the scanning direction. The relative coefficient of friction for PP, and PP masterbatches containing 5 wt. % and 10 wt. % MS0825 POSS is shown in Table 1. The incorporation of 10 wt. % MS0825 POSS in PP results in an almost 60% reduction in relative coefficient of friction (COF). The reduction in surface friction renders polymers containing POSS useful for low friction textiles and molded articles.

TABLE 1

Comparisons of adhesion and friction for PP MS0825 POSS masterbatches

| Composition | COF | Relative Adhesive Force (nN) | | % COF Reduction |
|---|---|---|---|---|
| | | Intercept | Force Curve | |
| PP control | 0.17 | 37.77 | 30.76 | — |
| PP/5% MS0825 POSS | 0.14 | 20.57 | 17.35 | 18 |
| PP + 10% MS0825 POSS | 0.07 | 26.29 | 15.02 | 59 |

Example 4

Friction Reduction of Projectiles

Figure 7:
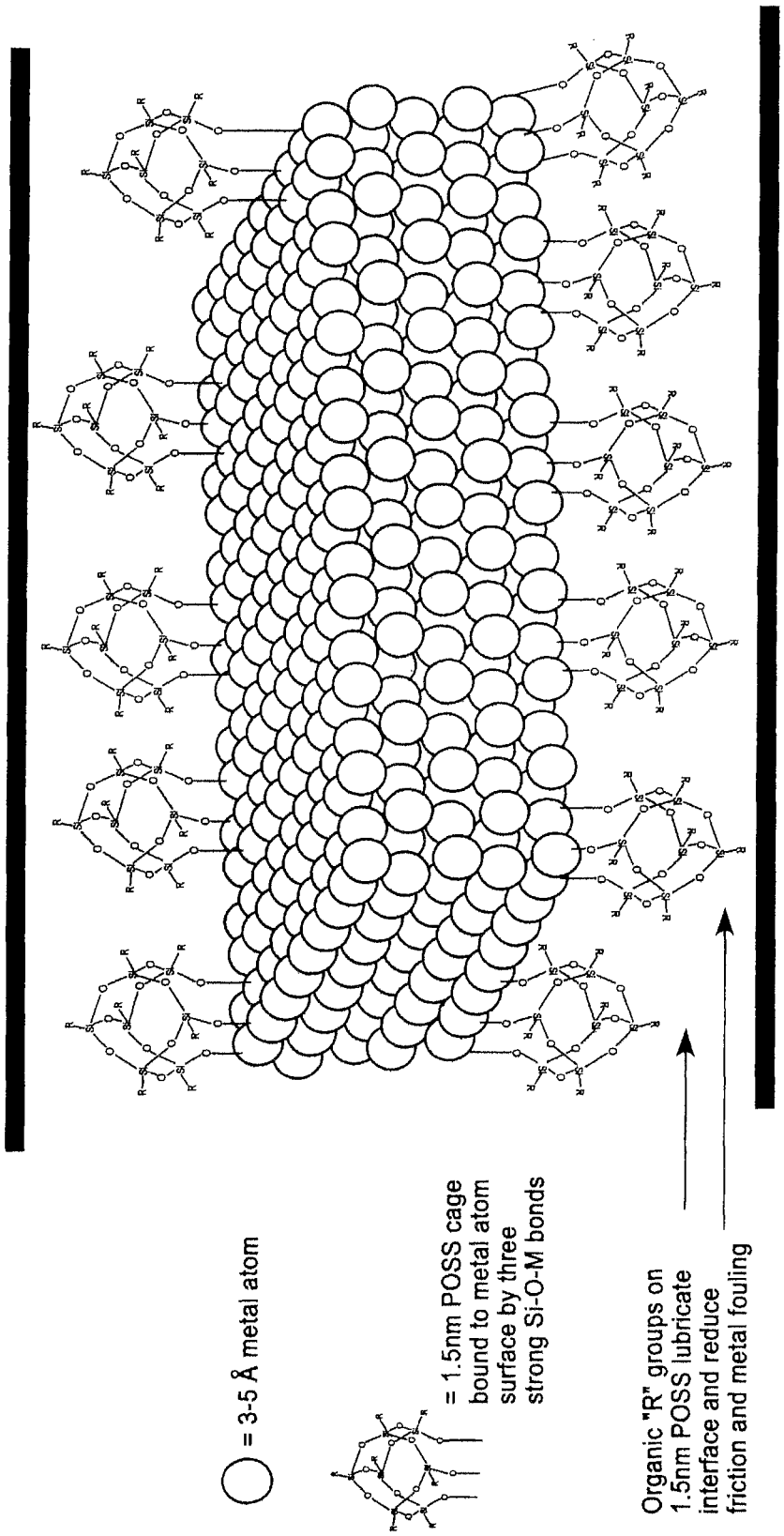
FIG. 7 illustrates the use of a nanostructured chemical to decrease the amount of surface in contact with a projectile particle.

As illustrated in FIG. 7, nanostructured chemicals can be utilized to decrease the surface area and subsequent coefficient of friction for dissimilar surfaces. This application is particularly attractive for application as low friction projectiles.

A series of 0.22 cal rimfire and 0.50 cal true-to bore bullets were coated with various POSS nanostructured chemicals and their ballistic properties were measured. Given the use of lead and copper in bullets, POSS cages functionalized with silanol groups and thiol groups were found to be particularly adherent to the bullets due to the formation of strong bonds to the metal.

Each of the bullets was cleaned prior to coating to remove particulates. The bullets were then dipped into a solution containing dichloromethane and dissolved POSS. The preferred POSS systems that are useful for such application are heptaisoOctyl POSS trisilanol (#SO1455) and heptaisoOctylPOSSpropylthiol (#TH1555) in solution loadings from 0.1 wt % to 10 wt %. The bullets were then air dried.

Ballistic testing was conducted using a fire-arm which was cleaned before and after firing. The purpose of the cleaning was to examine the amount of residue and to avoid cross contamination. A noticeable improvement in both bullet velocity and reduction of bullet drop was observed as well as reduction in barrel residue (fouling) (Table 2). Such enhancements are of great value to sportsmen, law enforcement and the military.

TABLE 2

Comparison of ballistics for 0.22 caliber bullets
Bullet Caliber 0.22

| Coating | Ave. Vel. ft/sec | Std deviation ft/sec | Trajectory drop |
|---|---|---|---|
| Control | 1046 | 70.75 | bullets dropped 7" at 60 yds |
| TH1555 | 1064 | 35.45 | bullets dropped 4.5" at 60 yds |
| SO1455 | 1062 | 14.24 | bullets dropped 4.5" at 60 yds |

Example 5

Friction Reduction of Sabots

The use of nanoscopic POSS to attain low friction polymer surfaces is also desirable for sabots to reduce energy loss. A wide series of POSS polyolefin and polyamide masterbatches were prepared and injection molded into shotgun wads. The wads were then loaded with 1.25 oz of #2 steel shot using same-lot, factory controlled powder loadings. The rounds were then fired and both shot velocity and pattern were measured (Table 3). The findings indicated and increase in shot velocity and significantly tighter shot pattern. Such enhancements are of great value to sportsmen, law enforcement and the military. The combination of POSS coated projectiles and low friction sabots is also envisioned.

TABLE 3

Comparison of ballistics for 12 gauge steel-shot shotgun wads.

| Composition | Ave. Shot Velocity ft/sec | Resulting Shot pattern | Wad flight distance |
|---|---|---|---|
| LDPE Control | 1342 | modified choke | |
| LDPE 5 wt % MS0825 | 1364 | equivalent to full choke | wad traveled 20 yds further |
| LDPE 5 wt % SO1450 | 1364 | equivalent to full choke | wad traveled 18 yds further |
| LDPE 5 wt % MS0830 | 1356 | modified-full choke pattern | wad traveled 10 yds further |

While certain representative embodiments and details have been shown for purposes of illustrating the invention, it will be apparent to those skilled in the art that various changes in the methods and apparatus disclosed herein may be made without departing from the scope of the invention which is defined in the appended claims.

What is claimed is:

1. A method for forming a coating material comprising the steps of:
   (a) providing a carbon chain polymer material selected from the group consisting of polyacrylates, polyepoxides, polyolefins, polyethers, polyesters, polycarbonates, polyamides, polyurethanes, polyimides, polyphenols, cyanate ester polymers, polyureas, resoles, polyanalines, fluoropolymers, polystyrenes, polynitriles, aromatic oxide polymers, and aromatic sulfide polymers,
   (b) providing a particulate for a coating material; and
   (c) mixing a nanostructured chemical selected from the group consisting of POSS, POS, and POMS with the polymer and particulate to form a coating material, wherein the nanostructured chemical reactively bonds with the particulate to form a reaction product; wherein the surface roughness or volume of the reaction product particulate is at least twenty-five percent greater or smaller than the surface roughness or volume of the unreacted particulate material selected from (b).

2. The method of claim 1, wherein the surface area of the material is modified by the nanostructured chemical.

3. The method of claim 1, wherein the volume of the material is modified by the nanostructured chemical.

* * * * *